United States Patent
Ferris et al.

[11] 3,764,229
[45] Oct. 9, 1973

[54] HELICOPTER BLADE PITCH LOCK
[75] Inventors: Donald L. Ferris, Newtown; Luigi Vacca, Milford, both of Conn.
[73] Assignee: United Aircraft Corporation, Hartford, Conn.
[22] Filed: Feb. 18, 1972
[21] Appl. No.: 227,359

[52] U.S. Cl. ............................. 416/114, 416/143
[51] Int. Cl. .................................. B64c 27/50
[58] Field of Search .................................................
416/112–115, 142, 143, 153, 159, 162, 46

[56] References Cited
UNITED STATES PATENTS
| | | | |
|---|---|---|---|
| 2,755,870 | 7/1956 | Gerstenberger | 416/114 |
| 2,861,640 | 11/1958 | DuPont | 416/114 |
| 2,957,527 | 10/1960 | Gerstenberger | 416/114 |
| 2,973,815 | 3/1961 | Sznycer | 416/114 |
| 2,978,038 | 4/1961 | Doman et al. | 416/114 |
| 3,002,569 | 10/1961 | Doblhoff | 416/153 X |
| 3,207,227 | 9/1965 | Timewell | 416/46 |
| 3,219,121 | 11/1965 | Barden | 416/153 |
| 3,256,780 | 6/1966 | Riley et al. | 416/114 X |

Primary Examiner—Everette A. Powell, Jr.
Attorney—Vernon F. Hauschild

[57] ABSTRACT

A helicopter blade pitch lock in which the locking takes place in the pitch change servos which are connected to the swashplate so as to vary blade pitch. The locking occurs by locking the fixed and movable members of the servo to one another, thereby locking the blade in pitch.

6 Claims, 7 Drawing Figures

PATENTED OCT 9 1973
3,764,229
SHEET 1 OF 5
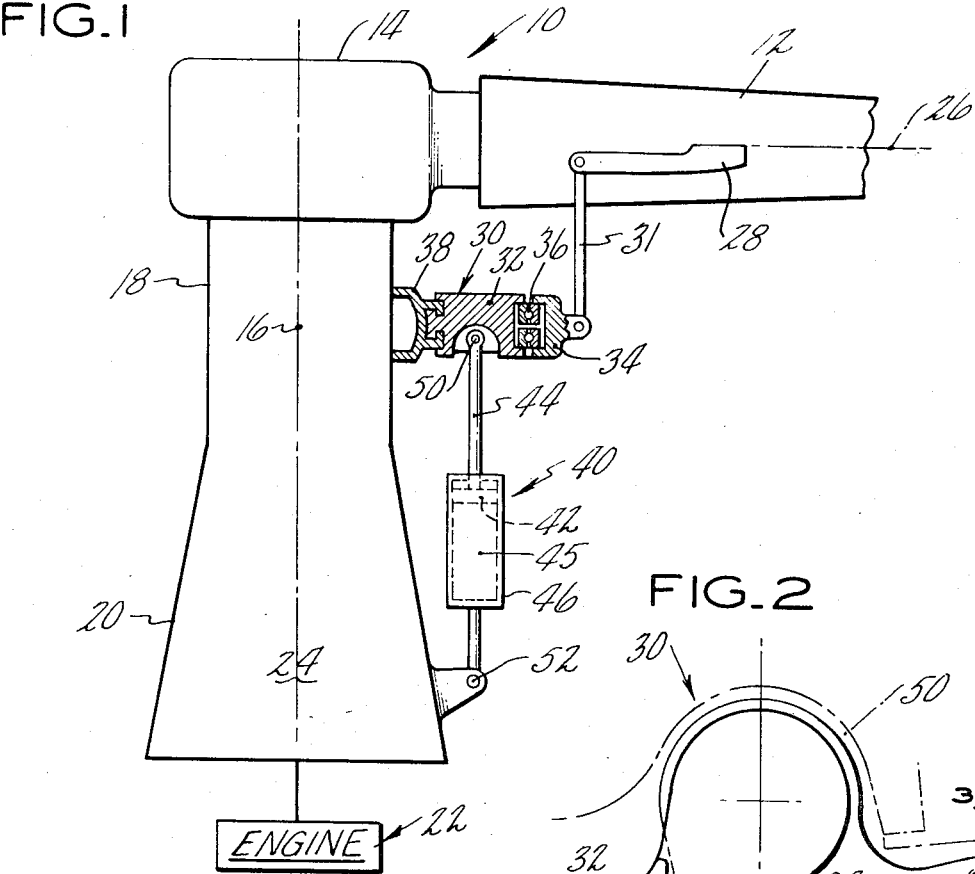
FIG.1
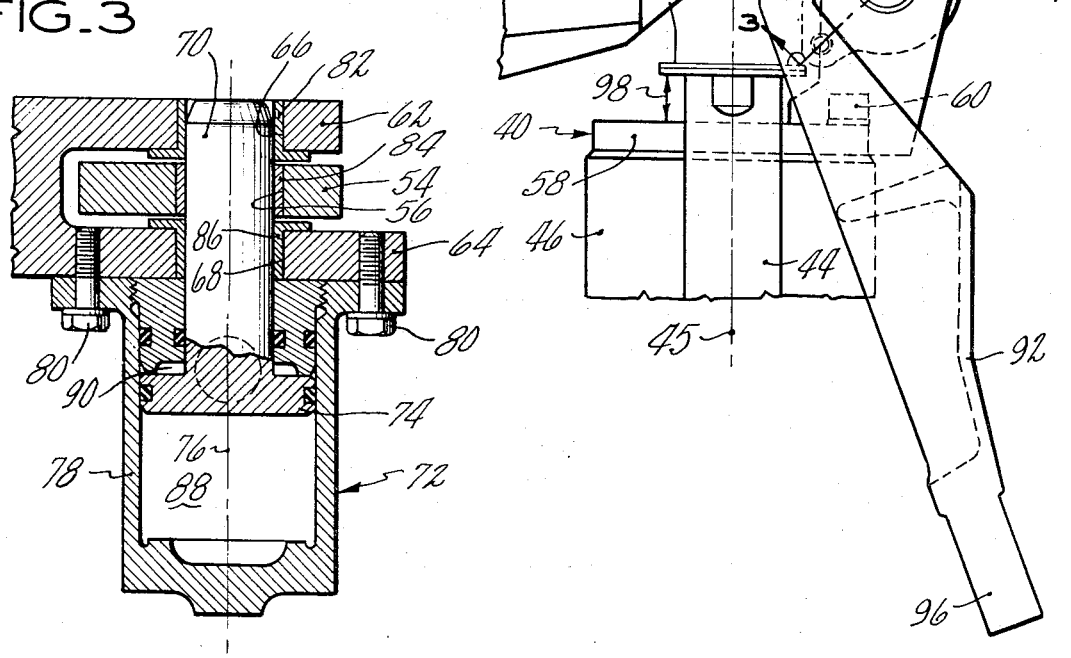
FIG.2
FIG.3 ing with respect to axis 16 so as to vary blade pitch cyclically. A plurality of servo assemblies 40 are positioned circumferentially about swashplate assembly 30 and preferably consist of a piston member 42 having a piston rod 44 projecting therefrom mounted for reciprocation along the axis 45 of cylinder or housing 46. Cylinder or housing 46 is pivotally connected to transmission housing 20 to be supported in pivotal but otherwise fixed relationship therefrom. Accordingly, reciprocation of piston 42 within power piston-cylinder 46 causes motion of swashplate assembly 30 and hence varies the pitch of blades 12.

Referring to FIGS. 2 and 3 we see a first embodiment of the invention. Stationary swashplate member 32 is pivotally connected at pivot joint 50 to servo piston rod 44, which projects from servo housing or cylinder 46 to reciprocate along cylinder and piston axis 45. The opposite end of cylinder housing 46 is pivotally connected, as best shown in FIG. 1, to transmission housing 20 at pivot point 52. Piston rod 44 has lug member 54 projecting therefrom and lug 54 includes aperture 56. Cylinder housing 46 has cover member 58 attached thereto by any convenient connecting means, such as bolt member 60, and spaced lugs 62 and 64 project therefrom and include aligned apertures 66 and 68 which are adapted to align with aperture 56 of piston lug 54 so as to receive pitch lock pin 70 therethrough to lock the movable piston portion 42–44 of servo 40 to the stationary housing portion 46 thereof and thereby locking blades 12 in a fixed pitch condition for any purpose, such as blade folding.

Pitch lock pin 70 is actuated by power piston-cylinder unit 72 and is integrally or otherwise conventionally connected to piston 74 thereof, which piston reciprocates along axis 76 of cylinder or housing 78. Power servo 72 can be actuated in any convenient fashion, such as pneumatically or hydraulically, and is supported from lug 64 by conventional bolt mechanisms 80. Apertures 56, 66 and 68 preferably include sleeve or bearing members 82, 84 and 86, as best shown in FIG. 3. Locking pin 70 is forced into its locked position, shown in FIG. 3, by the introduction of motive fluid into chamber 88, and is retracted to its pitch unlock position by the introduction of motive fluid into chamber 90.

Follower arm 92 is pivotally connected to piston rod 44 at pivot point 94 and is pivotally connected at its opposite end (not shown) to any convenient grounding mechanism, such as transmission housing 20, and includes one or more slip joints 96 somewhere in its length to permit piston 42 and piston rod 44 to reciprocate with respect to cylinder housing 46 but to prevent rotation therebetween so that lug 54 will remain in alignment with lugs 62 and 64 and so that apertures 66, 56 and 68 can be brought into alignment by reciprocation of piston 42 for blade pitch locking purposes when desired.

Preferably, as best shown in FIG. 2, the blade pitch is locked in the low collective pitch range of servo 40 as demonstrated by gap 98 in FIG. 2. Gap 98 is a definition of the additional travel of the servos necessary to reach a low cyclic condition, which is past or beyond the pitch lock plane established for folding.

It is important to note that while a single power piston-cylinder assembly or servo 40 is shown in FIGS. 1 and 2, there are actually preferably three such servo assemblies positioned circumferentially about stationary swashplate 32 to thereby establish the plane of the swashplate and the tip path plane of the blades.

A second embodiment of the invention is shown in FIGS. 4–7, to which reference will now be made. Cylinder or housing 46 is again pivotally connected at pivot points 50 and 52 between the swashplate stationary member 32 and a solid fixture, such as transmission housing 20. Piston 42 and piston rod 44 reciprocate therewithin about cylinder and piston axis 45, so that the cylinder 46 is the servo stationary part and the piston-piston rod 42–44 is the servo movable part. The corresponding parts depicted in the FIGS. 4–7 modification will carry corresponding reference numerals to their counterparts in the FIG. 1 and 2 embodiments. Housing 46 carries cylindrical sleeve 100 projecting therefrom concentrically about axis 45 and piston rod 44 carries cylindrical sleeve 102 concentrically about axis 45 in overlapping relationship to sleeve 100. Accordingly, as piston 42 is caused to reciprocate within cylinder 46 by the selective introduction of motive fluid into chambers 104 and 106 on opposite sides thereof, sleeves 100 and 102 are caused to move relative to one another along axis 45 and swashplate assembly 30 is caused to correspondingly reciprocate so as to change the pitch of the blades 12.

Seal or boot member 108 serves to prevent foreign matter from clogging and creating friction in the surfaces between sleeves 100 and 102 and apertures 110 permits any contamination or condensation to be ejected therethrough.

As best shown in FIG. 5, sleeve 100 has substantially diametrically opposed apertures 114 and 116 therein and sleeve 102 has substantially diametrically opposed apertures 118 and 120 therein. Apertures 114 and 118 align, as do apertures 120 and 116 so as to receive pitch lock pins 70A and 70B. Lock pins 70A and 70B are integrally attached to pistons 74A and 74B, which reciprocate along axes 76A and 76B of cylinders 78A and 78B of power servos 72A and 72B.

It is important to note that since apertures 114–120 are equidistant on opposites of axis 45, and therefore mates with lock pins 70A and 70B equidistant on opposite sides of axis 45, cancelling bending moments are established in the servos 40 by this pitch lock mechanism.

Lock pins 70A and 70B are caused to reciprocate by the selective introduction of motive fluid, such as hydraulic fluid, into the chambers on the opposite side of pistons 74A and 74B through conduits 130, 132, 134 and 136, respectively.

Since it is important to have blades 12 remain in their pitched-locked position during periods of time when such condition is desired, pitch lock plunger 140 is provided for each pitch lock pin 70A and 70B as best shown in FIG. 6. FIG. 6 shows single pitch lock pin 70A, but it should be borne in mind that FIG. 6 is equally applicable to the mechanism used for pitch lock pin 70B, which is preferably identical in all respects to that shown in FIG. 6. Pitch lock-lock plunger 140 is received in annular groove 142 of pitch lock pin 70A and serves to retain the pitch lock pin 70A in the pitch locked condition shown in FIG. 5. Pitch lock-lock plunger 140 is hydraulically actuated by servo piston-cylinder mechanism 144, which includes piston member 146 reciprocating within cylinder member 148. Pitch lock-lock plunger 140 can by hydraulically retracted by causing piston 146 to move rightwardly

3,764,229

HELICOPTER BLADE PITCH LOCK

CROSS-REFERENCES TO RELATED APPLICATIONS

A Patent Application, Ser. No. 227,395 entitled Helicopter Blade Pitch Lock in the names of George Kudasch and Karl H. Wallischeck was filed on Feb. 18, 1972 herewith and claims some of the subject matter shown and described herein.

BACKGROUND OF THE INVENTION

1. Field of Invention

This invention relates to pitch locks for helicopter blades and more particularly for pitch locks which perform the pitch lock function by locking the movable portion of the pitch change servo to the fixed portion of the pitch change servo.

2. Description of the Prior Art

It is known to be desirable to lock helicopter blades against pitch change motion during operation, such as blade folding operation, to precisely position blades relative to specific aircraft envelope requirements. Pitch locking also serves to keep aerodynamic and blade weight shifting loads off the pitch change servo mechanism, such as the hydraulic piston, upon which such loads would be imposed if the blades were not locked in pitch.

It is conventional in the prior art, such as in U.S. Pats. Nos. 3,438,446 or 3,369,611, to perform the pitch locking function by locking the blade sleeve to the blade spindle. This requires a pitch lock for each blade and a total of six pitch locks when there are six blades. It is known geometrically that any three points establish a plane. This holds true when establishing a pitch plane for all the blades in folding. The use of six pitch locks in the prior art, or any number of pitch locks over three, presents the problem of having to finely tune the number of pitch locks over three into the plane of the three established as the pitch lock plane to insure proper folding operation. This fine tuning of the extra pitch locks above three is conventionally done by manual adjustment which is time consuming and difficult to accomplish. In addition, jamming, fretting and galling of the pitch locks has been encountered as a result of the fine tuning becoming untuned. This produces a system with less reliability. Since the pitch change servos, of which there are three in a helicopter rotor system, are used to establish different pitch planes for the blades, it is convenient to attach the pitch lock system to these servos. In addition, the pitch plane required for blade folding must fall within the total pitch change range of the servos.

SUMMARY OF THE INVENTION

A primary object of the present invention is to provide an improved helicopter blade pitch lock mechanism in which the movable portion of the pitch change servo is connected or locked to the fixed portion of the pitch change servo, thereby locking the blades in pitch.

In accordance with the present invention, since there are but three pitch change servos in a conventional helicopter rotor, the number of pitch locks is reduced, thereby reducing the complexity and weight required by the pitch lock system.

A further feature of the present invention is the removing of the pitch locks from the rotor head per se, thereby reducing rotor head drag, permitting a smaller rotor head package and eliminating the need for hydraulic slip rings between movable and stationary parts of the helicopter for pitch lock actuation. However, hydraulic slip rings are still needed for blade folding pin pullers.

In accordance with a further feature of the present invention, the improved pitch lock locks the feathering axis of the blade at a selected angle with respect to the plane of the rotor and this locking takes place in a low collective pitch setting so that blades in their fully folded position present the least resistance to wind loads from any direction.

A further feature of this invention is the freedom of the servos to actuate through the pitch lock plane to their fullest cyclic and collective pitch ranges without interference of the pitch locking mechanisms.

In accordance with a further aspect of the present invention, the entire pitch lock mechanism and its hydraulic actuating system are located on a stationary, as opposed to a rotary portion of the helicopter.

In accordance with the present invention, the overall weight, complexity and reliability of the pitch lock system is improved.

Other objects and advantages of the present invention may be seen by referring to the following description and claims, read in conjunction with the accompanying drawings.

BRIEF DESCRIPTION OF THE DRAWINGS

FIG. 1 is a partial side view of a helicopter rotor illustrating the environment of the invention.

FIG. 2 is an enlarged side view of a first embodiment of the pitch lock system.

FIG. 3 is a view taken along line 3—3 of FIG. 2.

DESCRIPTION OF THE PREFERRED EMBODIMENT

Figure 4:
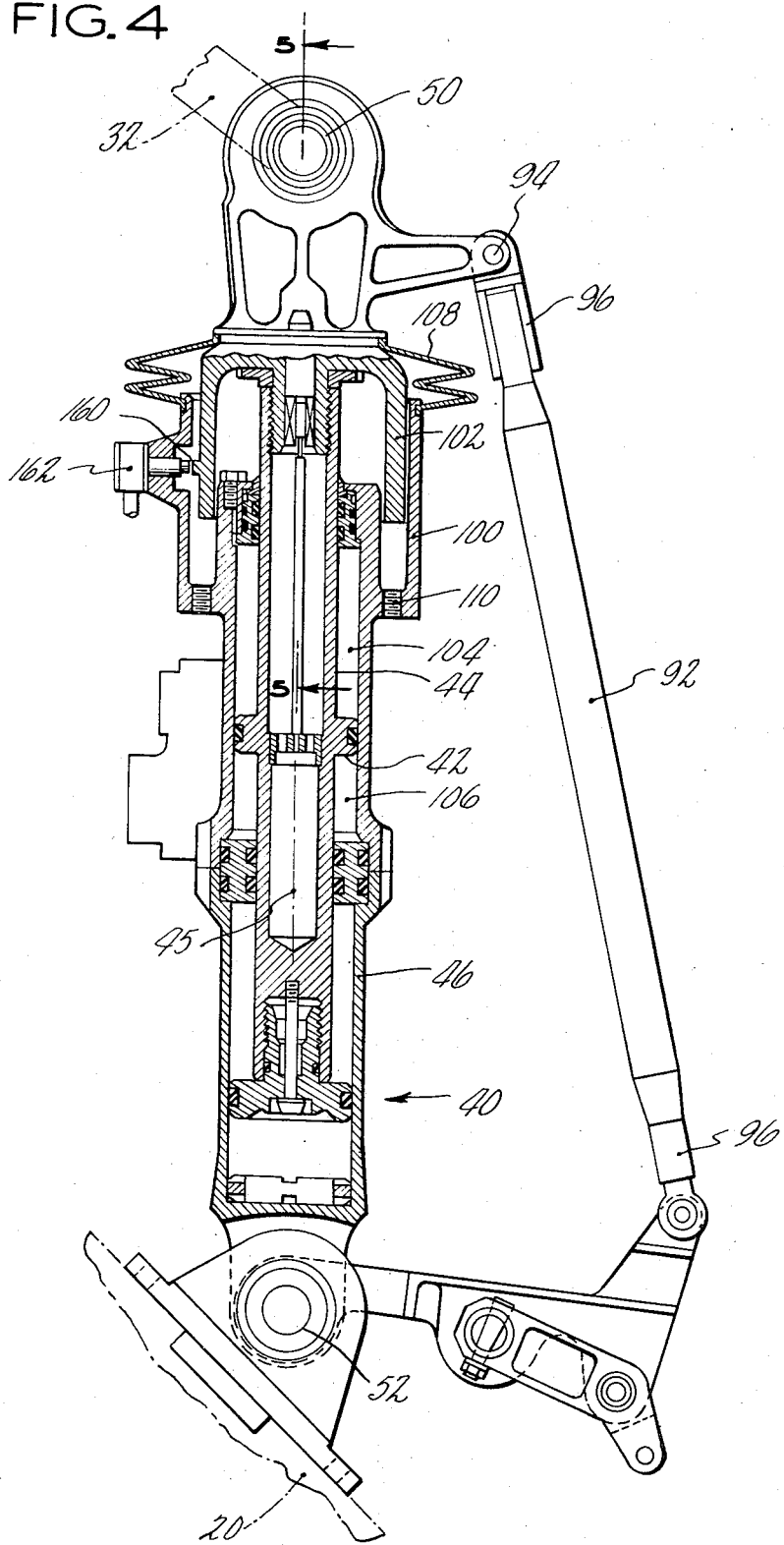
FIG. 4 is a side view of a second embodiment of the invention, partially broken away, to show the details of the pitch lock.

Referring to FIG. 1 we see helicopter rotor 10 which comprises a plurality of blades 12 equally spaced circumferentially about and supported from hub 14 so as to rotate therewith in lift generating fashion about axis of rotation 16. Hub 14 is supported from support sleeve 18 which may or may not be part of transmission housing 20. Engine 22, which may be of any conventional type, serves to drive rotor 10 about axis 16 through transmission 24 so as to properly reduce engine speed to desired rotor speed. Each of blades 12 is mounted from hub 14 so as to be rotatable about feathering axis 26 so as to vary pitch. Pitch arm or horn 28 projects from each blade 12 and is connected to swashplate assembly 30 by a pitch change control rod 31. Swashplate assembly 30 includes fixed swashplate member 32 and rotatable swashplate member 34 connected through bearing system 36. Swashplate assembly 30 is mounted from support sleeve 18 through spherical ball 38 such that it is capable of reciprocation along axis 16 to vary blade pitch collectively and so that it is capable of tiltwithin cylinder 148 as shown in FIG. 6, thereby permitting the lock pin 70A to be retracted by the action of servo 72A. Since it is equally desirable to have the pitch locks locked in their withdrawn or non-locked positions during periods when blade pitch locking is undesirable, a pitch lock-unlock plunger 150 is provided for this purpose. As shown in FIG. 6, pitch lock-unlock plunger 150 is in its withdrawn condition by abutting the solid outer wall of lock pin 70A, despite the fact that plungers 140 and 150 are bias toward axis 45 by spring members 152 and 154. When pin 70A is withdrawn from engagement with aperture 118, plunger 150 is hydraulically actuated to its inboard position closest axis 45 so as to physically prevent pitch lock 70A from returning to its FIG. 5 locked position.

Figure 5:
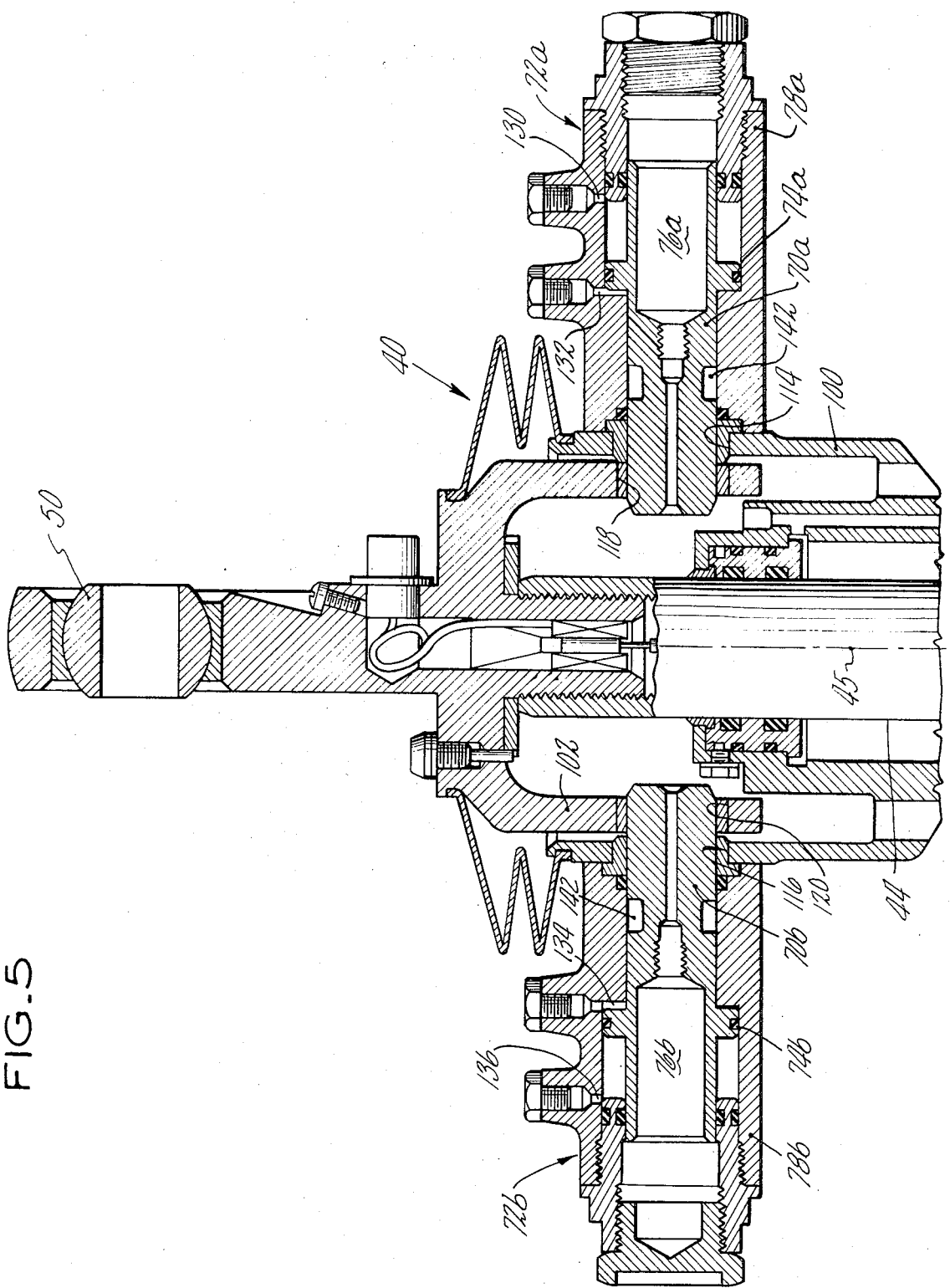
FIG. 5 is a partial cross-sectional showing taken along line 5—5 of FIG. 4.
Figure 6:
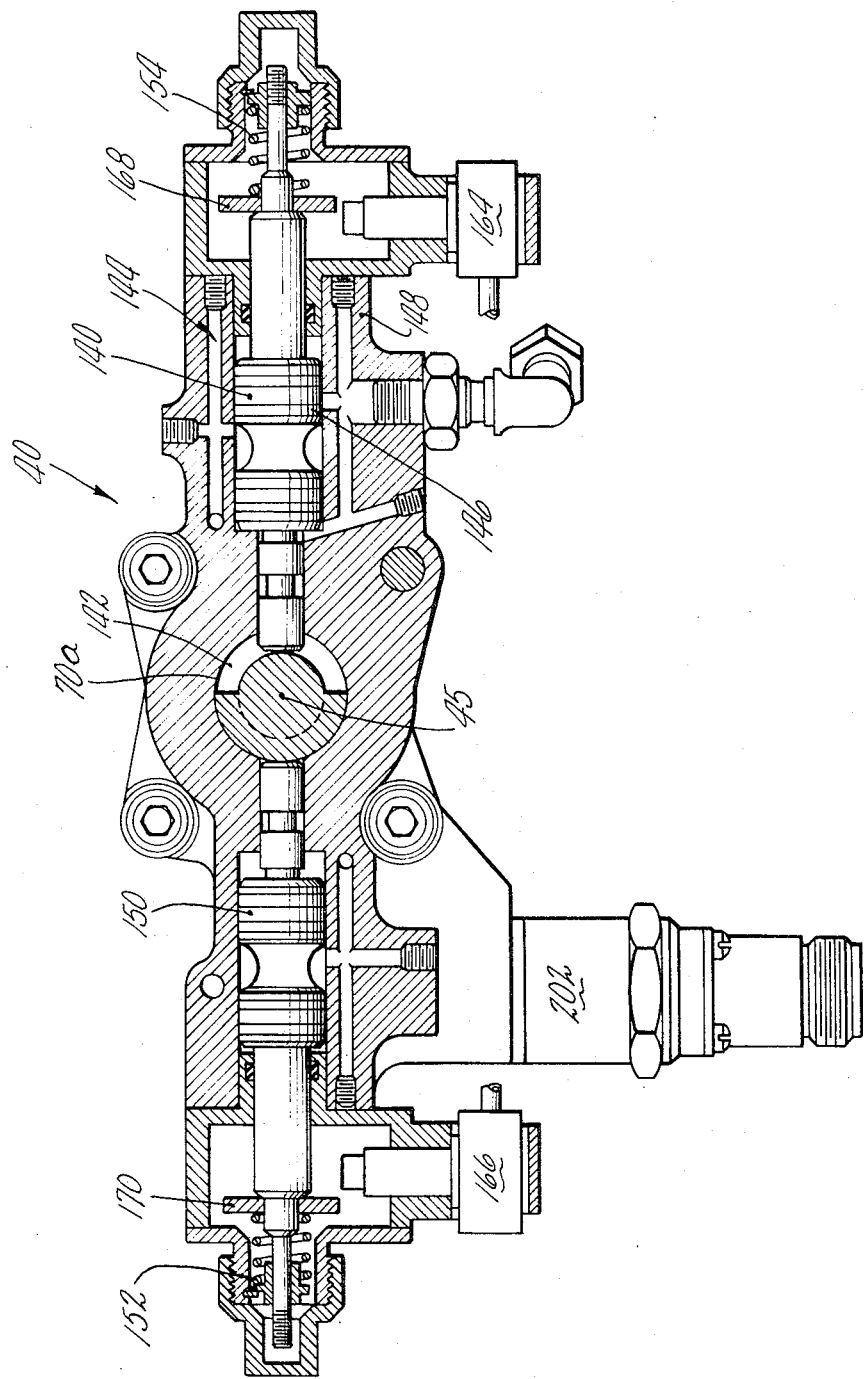
FIG. 6 is a cross-sectional showing, partly broken away, to show the lock-in and lock-out members of one of the two pitch locking pins.

It will therefore be seen that the two pitch locks 70A and 70B are both locked in their pitch lock positions shown in FIG. 5 during blade pitch locked operation and locked out of their pitch lock positions during blade pitch unlocked locked operation. Identical mechanism is used for each pitch lock 70A and 70B of the type shown in FIG. 6.

Figure 7:
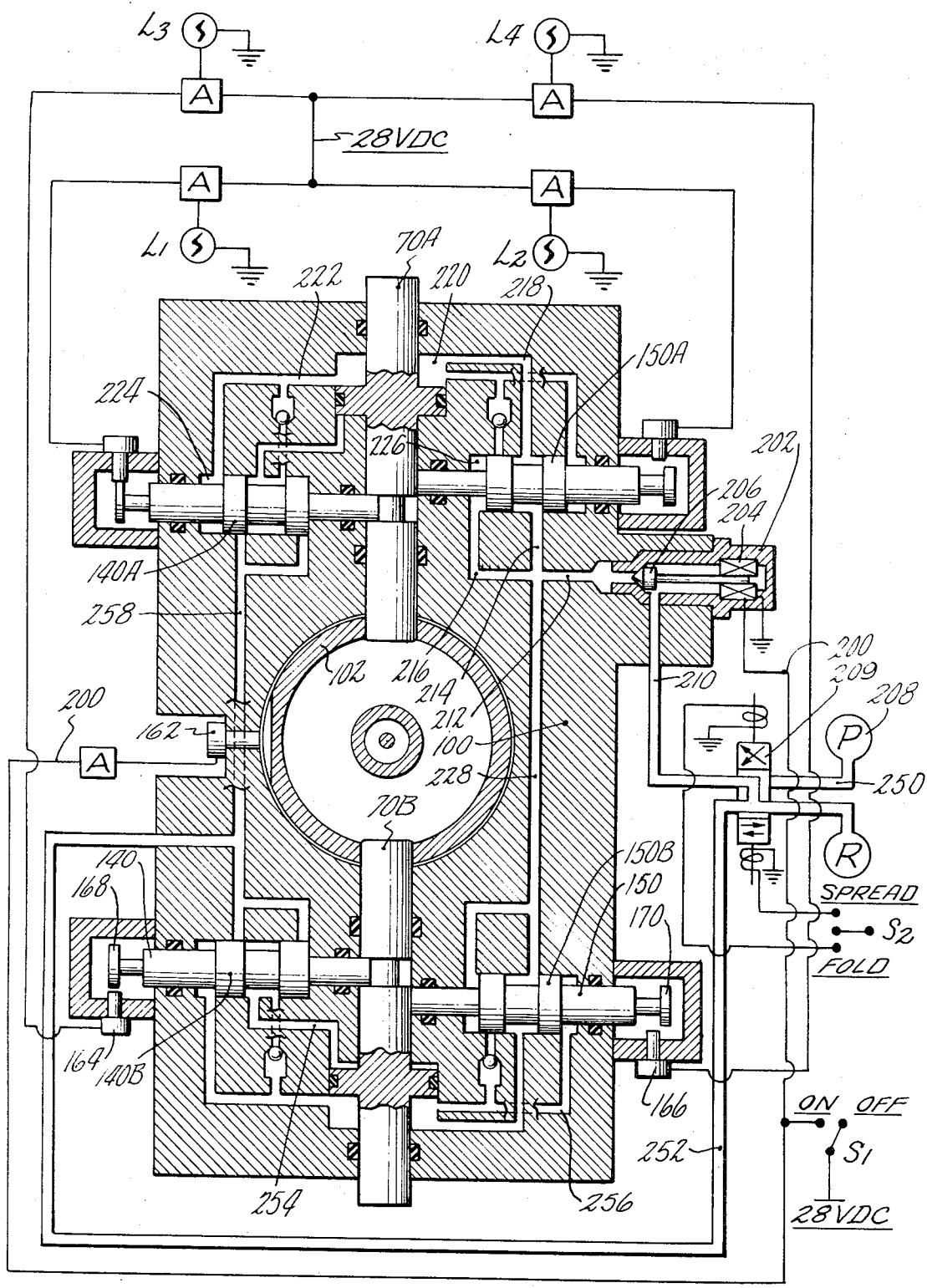
FIG. 7 is a schematic representation of the pitch lock actuating and sequencing system.

The FIG. 4-7 modification includes hydraulic sequencing mechanism shown in FIG. 7 which serves the function of sequentially unlocking a locked pitch lock for withdrawal, withdrawing the pitch lock and then locking the withdrawn pitch lock out of engagement and, conversely, sequentially unlocking a withdrawn pitch lock for engagement, actuating the pitch lock into engagement, and locking the pitch lock in pitch lock engagement. In this connection, it is important to note in FIG. 4 that piston sleeve member 102 includes projection 160 which aligns with proximity switch 162 of the FIG. 7 system when sleeves 100 and 102 are so positioned that apertures 114-120 are in alignment as shown in FIG. 5. In addition, proximity switches 164 and 166 are positioned to be in alignment with projections 168 and 170 of pitch lock-lock plunger 140 and pitch lock-unlock plunger 150, respectively, and these proximity switches 162-166 provide signals to the pilot or operator to tell him of the position of piston 42 and plungers 140 and 150 at all times.

Referring to FIG. 7, we see a schematic of the sequencing and control system for our pitch lock mechanisms and these pitch locks are shown in their FIG. 5 locked positions. The sequence of operation which brought the pitch locks 70A and 70B into their locked position shown in FIGS. 5 and 7 is that the pilot utilized conventional control mechanism to selectively position servo pistons 42 in servo housings 46 so as to bring apertures 114-120 into alignment, and therefore lug 160 into alignment with proximity switch 162. Pilot must select "fold mode" to bring pump 208 to conduit 210 through valve 209. Proximity switch 162 transmits an electrical signal through line 200 to shutoff valve 202 so as to cause the solenoid portion 204 thereof to move plunger 206 to the right. With plunger 206 to its far right position, hydraulic actuating fluid from pump 208 is passed through selector valve 209 to conduit 210 and shutoff valve 202 through conduit 212, from which it branches into conduits 214 and 216. Hydraulic fluid from conduit 212 which passes through conduit 216 enters chamber 226 of plunger 150A so as to power plunger 150A to its retracted position. Conduit 214 then conducts hydraulic fluid through plunger 150A and conduit 218 into chamber 220 of servo 72A so as to power pitch lock pin 70A to its FIG. 7 locked position, and then provides hydraulic fluid through conduit 222 to chamber 224 of plunger 140A to power it to its FIG. 7 locked position, once lock pin 70A is in its FIG. 7 locked position.

It will accordingly be seen that the signals from proximity switch 162, which indicated that apertures 114-120 of sleeves of 100 and 102 were in alignment provided the necessary signal to withdraw lock-out plunger 150A, to actuate lock pin 70A to its locked position, and to actuate lock-in lock plunger 140A to its locked position. In similar fashion, fluid from conduit 212 passes through conduit 228 and performs the same function with respect to plungers 150B, 140B and lock pin 70B.

Still viewing FIG. 7, lets consider the situation in which the blades are in the locked condition shown in FIG. 7 and the pilot wishes to unlock the blades to permit pitch change thereof for normal flight operation or other operations.

When the blades are in their fully unfolded or operable position, proximity switches on the rotor head (not shown) actuate selector valve 209 so as to cause actuating fluid from pump 208 to pass through conduit 250, then through conduit 252 to withdraw plunger 140B. With plunger 140B withdrawn to thereby release lock pin 70B in its locked position, hydraulic fluid then passes through conduit 254 to retract lock pin 70B from its FIG. 7 locked position to its retracted position. With the lock pin 70B so retracted, the hydraulic fluid then passes through conduit 256 to drive plunger 150B to its active or locked position, thereby locking lock pin 70B into its retracted position as plunger 150B engages the recess in lock pin 70B now shown in FIG. 7 as being engaged by plunger 140. At the same time that this hydraulic sequence is taking place with respect to the unlocking, withdrawal and relocking of lock pin 70B, hydraulic fluid passing through conduit 258 performs the same function simultaneously with respect to plunger 140A, lock pin 72A and plunger 150A.

It will accordingly be seen that signals from the rotor serve to utilize the mechanism shown in FIG. 7 to sequentially unlock the locked blade locks from their locked positions shown in FIG. 7, withdraw the blade locks to a retracted or withdrawn position, and lock the blade locks in that retracted or withdrawn position.

We wish it to be understood that we do not desire to be limited to the exact details of construction shown and described, for obvious modifications will occur to a person skilled in the art.

We claim:

1. A helicopter rotor having:
 A. a plurality of blades mounted for rotation about an axis and for pitch change motion,
 B. means to vary blade pitch including:
  1. a swashplate assembly mounted to be movable relative to said blades and connected thereto so that swashplate motion causes blade pitch change,
  2. means to move said swashplate assembly including at least one power cylinder-piston assembly connected to said swashplate assembly,
  3. means to lock said piston to said cylinder to thereby prevent blade pitch change motion, and
  4. wherein said cylinder is stationary and said piston is movable therewithin and attached to a piston rod which is connected to said swashplate assembly, and wherein said last named means includes lug members projecting from said piston rod and from said cylinder and having alignable apertures therein, and further including lock pin means insertable into said apertures when so aligned to lock said piston with respect to said cylinder and hence prevent blade pitch change motion.

2. A helicopter rotor according to claim 1 wherein said swashplate assembly is mounted for motion between a low and a high collective pitch position and wherein said apertures align to receive said lock pin means when the swashplate assembly is at a low pitch position.

3. A helicopter rotor according to claim 1 and including means to selectively insert said lock pin means into said aligned apertures to lock said cylinder and said piston together and to withdraw said lock pin means from said apertures to free said piston from motion with respect to said cylinder.

4. A helicopter rotor according to claim 1 and including three power cylinder-piston assemblies connected to said swashplate assembly and positioned circumferentially thereabout.

5. A helicopter rotor having:
A. a plurality of blades mounted for rotation about an axis and for pitch change motion,
B. means to vary blade pitch including:
  1. a swashplate assembly mounted to be movable relative to said blades and connected thereto so that swashplate motion causes blade pitch change,
  2. a servo mechanism comprising stationary and movable parts and with at least one movable part connected to said swashplate to cause swashplate motion, and
  3. locking means actuatable to interconnect at least one servo mechanism movable part to at least one servo mechanism stationary part to thereby prevent blade pitch change and wherein said locking means includes members projecting from at least one stationary part and at least one movable part of said servo mechanism and having alignable apertures therein, and means actuatable to extend through said aligned apertures to lock said servo mechanism stationary and movable parts, and to be withdrawn from said apertures to free said movable part for motion with respect to said stationary part.

6. A helicopter rotor having:
A. a plurality of blades mounted for rotation about an axis of rotation and for pitch change motion about a feathering axis,
B. means to vary blade pitch including:
  1. a swashplate assembly mounted to be movable relative to said blade,
  2. means connecting said swashplate to each of said blades so that swashplate motion causes each of said blades to change pitch by moving about said feathering axis,
  3. a servo mechanism comprising stationary and movable parts and with at least one movable part connected to said swashplate to cause swashplate motion,
  4. means to support said servo mechanism,
  5. locking means actuatable to interconnect at least one servo mechanism movable part to at least one servo mechanism stationary part to thereby prevent blade pitch change, wherein said locking means includes alignable apertures in said one servo mechanism movable part and said one servo mechanism stationary part, and a pin member actuatable to extend through said aligned apertures to lock said one movable part and said one stationary part, and
  6. means to actuate said pin member.

* * * * *